United States Patent
Steinberg et al.

(10) Patent No.: US 11,788,903 B2
(45) Date of Patent: Oct. 17, 2023

(54) OPTICAL TEMPERATURE SENSOR HEAD, TEMPERATURE SENSOR DEVICE AND ELECTRIC MACHINE HAVING A TEMPERATURE SENSOR HEAD

(71) Applicant: NEXANS, Courbevoie (FR)

(72) Inventors: Helmut Steinberg, Stornstein (DE); Dietmar Volkl, Plossberg (DE)

(73) Assignee: NEXANS, Courbevoie (FR)

( * ) Notice: Subject to any disclaimer, the term of this patent is extended or adjusted under 35 U.S.C. 154(b) by 239 days.

(21) Appl. No.: 17/314,945

(22) Filed: May 7, 2021

(65) Prior Publication Data
US 2021/0364369 A1    Nov. 25, 2021

(30) Foreign Application Priority Data
May 12, 2020  (EP) ..................................... 20305481

(51) Int. Cl.
*G01K 11/12*    (2021.01)
*G01K 1/16*    (2006.01)
(Continued)

(52) U.S. Cl.
CPC ............. *G01K 11/12* (2013.01); *G01J 5/0806* (2013.01); *G01J 5/0821* (2013.01); *G01K 1/16* (2013.01);
(Continued)

(58) Field of Classification Search
CPC .......... G01K 11/12; G01K 1/16; G01K 11/32; G01K 11/3213; G01K 13/00; G01J 5/0806; G01J 5/0821
See application file for complete search history.

(56) References Cited

U.S. PATENT DOCUMENTS

| | | | | |
|---|---|---|---|---|
| 4,448,547 A | * | 5/1984 | Wickersheim | ..... G01K 11/3213 250/461.1 |
| 4,948,958 A | * | 8/1990 | Sweeney | ................... G01J 5/08 374/E11.018 |

(Continued)

FOREIGN PATENT DOCUMENTS

JP    2010 210404    9/2010

OTHER PUBLICATIONS

English Machine Translation of JP-2010210404-A (Year: 2010).*
Search Report dated Sep. 25, 2020.

*Primary Examiner* — Nathaniel T Woodward
*Assistant Examiner* — Philip L Cotey
(74) *Attorney, Agent, or Firm* — Sofer & Haroun, LLP (57) ABSTRACT

An optical temperature sensor head having an optical fibre and a sensor material, which is optically connected to a free end of the optical fibre. The free end of the optical fibre has an overmould made of a plastics material, which engages over a free end of the optical fibre and forms a protective body. A transparent window is arranged in the protective body. The window permits an optical connection with the free end of the optical fibre. Luminescence radiation from a sensor material can enter the optical fibre. The protective body has the effect that the temperature sensor head is mechanically stable and is insensitive to environmental influences. A temperature sensor device having such a temperature sensor head. An electric machine having a winding with a winding wire, which is connected to a proposed temperature sensor head.

11 Claims, 5 Drawing Sheets

(51) Int. Cl.
G01K 11/32 (2021.01)
G01K 13/00 (2021.01)
G01K 11/3213 (2021.01)
G01J 5/0806 (2022.01)
G01J 5/0821 (2022.01)

(52) U.S. Cl.
CPC .......... *G01K 11/32* (2013.01); *G01K 11/3213* (2013.01); *G01K 13/00* (2013.01)

(56) References Cited

U.S. PATENT DOCUMENTS

| | | | | | |
|---|---|---|---|---|---|
| 4,988,212 | A | * | 1/1991 | Sun | G01D 5/268 374/161 |
| 5,183,338 | A | * | 2/1993 | Wickersheim | G01J 5/28 374/161 |
| 5,980,105 | A | * | 11/1999 | Rouhet | G01K 11/3213 374/161 |
| 8,139,905 | B1 | * | 3/2012 | Bazzone | G01K 13/08 398/79 |
| 8,982,354 | B2 | * | 3/2015 | O'Bryan | G01J 5/0821 356/446 |
| 2004/0258130 | A1 | * | 12/2004 | Gotthold | G01J 5/0007 374/208 |
| 2012/0026482 | A1 | * | 2/2012 | Dailey | G01L 1/242 356/43 |
| 2012/0086443 | A1 | * | 4/2012 | Bazzone | G01R 33/0327 250/227.14 |
| 2012/0146563 | A1 | * | 6/2012 | Zettner | G01J 5/04 318/473 |
| 2013/0028555 | A1 | * | 1/2013 | Dailey | G01D 5/35316 385/12 |
| 2014/0092938 | A1 | * | 4/2014 | Adolf | G01K 11/12 374/162 |
| 2014/0159550 | A1 | * | 6/2014 | O'Bryan | G01M 15/00 310/68 B |
| 2014/0161637 | A1 | * | 6/2014 | O'Bryan | F04D 13/08 417/63 |
| 2016/0274192 | A1 | * | 9/2016 | Zettner | G01K 13/08 |

* cited by examiner

OPTICAL TEMPERATURE SENSOR HEAD, TEMPERATURE SENSOR DEVICE AND ELECTRIC MACHINE HAVING A TEMPERATURE SENSOR HEAD

RELATED APPLICATION

This application claims the benefit of priority from European Patent Application No. 20 305 481.2, filed on May 12, 2020, the entirety of which is incorporated by reference.

FIELD

The invention relates to an optical temperature sensor head and to a device for optical temperature measurement, wherein a temperature is measured in particular by way of a luminescence measurement. The invention furthermore relates to an electric machine having a winding, the temperature of which is measured with a temperature measurement device according to the invention.

BACKGROUND

There are numerous applications in which exact temperature measurement is desirable. Of particular interest in the present case are applications under rough operating conditions or at locations where high magnetic fields are present.

Figure 4:
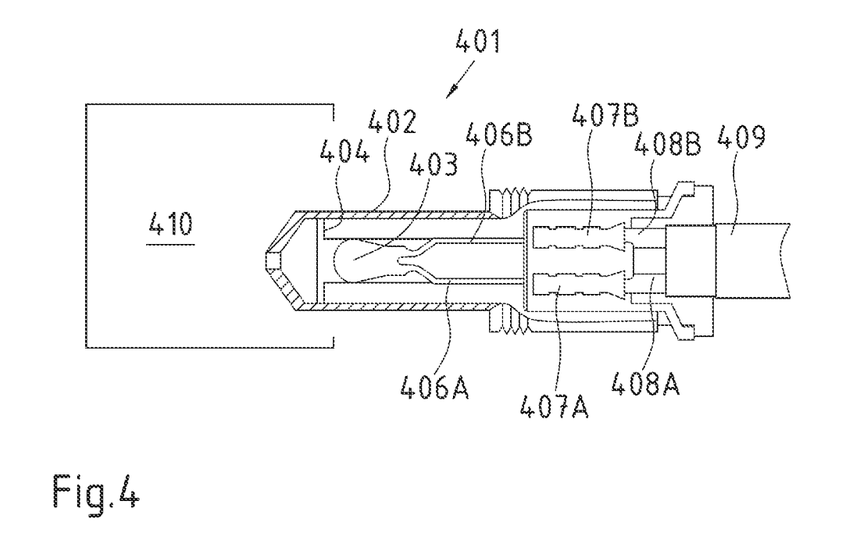
FIG. 4 shows a schematic setup of an electric temperature sensor.

Currently, thermoelectric elements or temperature-dependent resistors are primarily used in vehicles for measuring temperatures, for example in the measurement of a cooling water temperature. The temperature sensors used for this require a number of components for this purpose, as is shown in FIG. 4. The temperature sensor, which is denoted with the reference sign 401 in its entirety, has a housing 402, which accommodates an electric measurement element 403 held in an electrically insulating holder 404. The electric measurement element 403 has two connections 406A, 406B, which are connected to conductors 408A, 408B of a cable 409 at contact locations 407A, 407B. The housing 402 is filled with a heat transfer medium, for example with a thermoplastic filler, in order to attain good thermal coupling of the measurement element 403 and to shorten its reaction time. In the long term, a temperature sensor having such a construction is at risk of malfunction due to different coefficients of thermal expansion of the materials used, especially when numerous temperature cycles take place. In addition, the elements critical for the lifetime are encapsulated and cannot be repaired. In the presence of magnetic fields, suitable electromagnetic shielding of the temperature sensor is additionally necessary because measurement errors caused by induction voltages or induction currents can otherwise occur.

Due to the presence of at least two electrical connection lines and of the electromagnetic shielding that is necessary in many cases, the construction of the temperature sensor 401 is relatively large and therefore requires contact surfaces having a diameter of at least 3 mm on the object whose temperature is to be measured.

These properties of conventional temperature sensors are a disadvantage when it comes to measuring temperatures in electrical machines, for example electric driving machines or generators, because typically not much space is available there and, at the same time, high magnetic fields are present.

A solution is provided by an optical temperature measurement that is not based on line-bound electrical signals but on temperature-dependent luminescence radiation emitted by a sensor material that was previously excited with a light pulse from a light-emitting diode. A temperature measurement device that is suitable for this purpose is disclosed, for example, in U.S. Pat. No. 4,988,212. Specifically, two different methods are proposed in that document. According to a first method, the intensity of the emitted luminescence radiation in two different wavelength ranges is measured, and the temperature of the sensor material that emits the luminescence radiation and is in thermal contact with the object whose temperature is to be measured is determined from the ratio of the intensities. According to a second method, the sensor material is likewise excited with a light pulse, and the decay time or lifetime of the luminescence radiation is then measured. The intensity of the luminescence radiation decreases as a function of time in accordance with the following formula:

$$l(t)=l_0 \times \exp(-t/\tau), \text{ wherein}$$

l(t) is the intensity of the luminescence radiation as a function of time; $l_0$ is the initial intensity of the luminescence radiation; and $\tau$ is the decay time or luminescence lifetime.

Figure 5A:
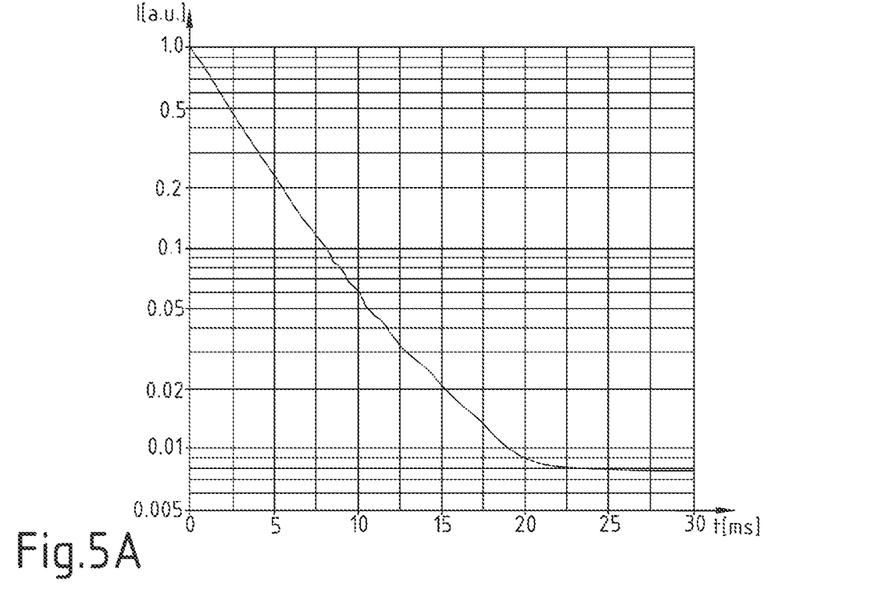
FIG. 5A shows a temporal drop in the intensity of luminescence radiation.
Figure 5B:
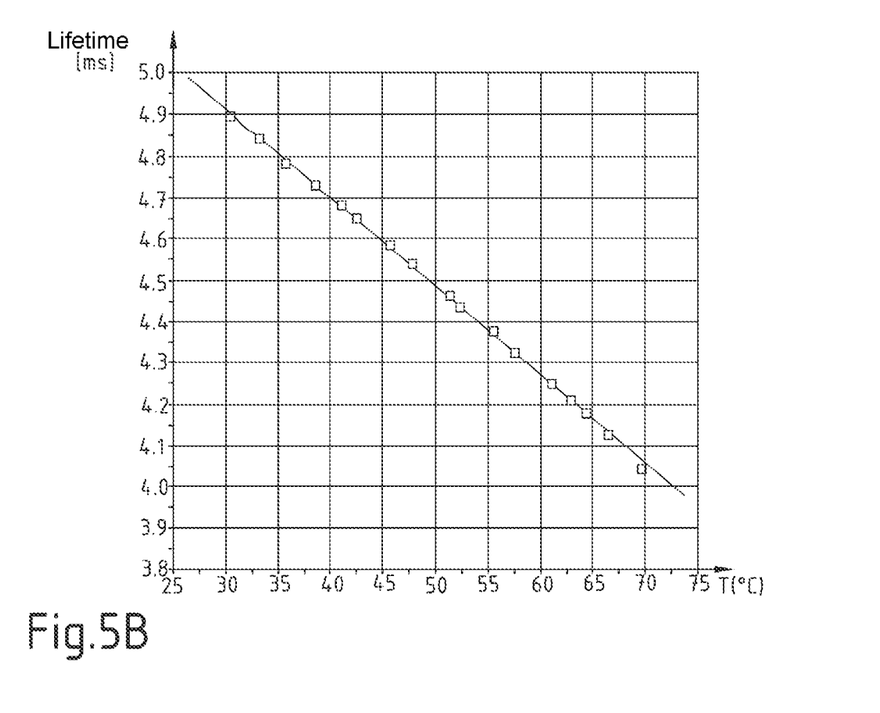
FIG. 5B shows a temperature-dependent lifetime of the luminescence radiation.

FIG. 5A shows the decrease in the intensity of the luminescence radiation as a function of time, and FIG. 5B shows the lifetime ascertained from the decaying luminescence radiation as a function of the temperature. In practice, the temperature is measured by initially determining the lifetime of the luminescence radiation and then ascertaining the temperature on the basis of stored data that reflect the relationship shown in FIG. 5B between the lifetime and the temperature.

The temperature measurement device and temperature sensors disclosed in U.S. Pat. No. 4,988,212 are less suitable for automotive applications due to their construction.

Proceeding therefrom, it is the object of the present invention to create a temperature measurement head and a temperature measurement device for overcoming, or at least addressing, one or more of the problems mentioned in the introductory part.

OBJECTS AND SUMMARY

For achieving this object, the invention proposes, according to a first aspect, a temperature measurement head, which is part of a temperature measurement device, which corresponds to a second aspect of the invention.

According to the first aspect of the invention, an optical temperature sensor head is proposed, comprising an optical fibre and a sensor material, which is optically connected to a free end of the optical fibre. The free end of the optical fibre has an overmould made of a plastics material, which engages over a free end of the optical fibre and forms a protective body. A transparent window is arranged in the protective body. The window permits an optical connection with the free end of the optical fibre. Luminescence radiation from a sensor material can enter the optical fibre. In another embodiment, the sensor material projects through the window into the protective body. In both embodiments, the protective body has the effect that the temperature sensor head is mechanically stable and is insensitive to environmental influences.

In one expedient embodiment, the optical fibre is a polymer optical fibre (POF). POFs are easier to produce than glass fibres, have a low weight, are flexible and can be connected to one another by means of conventional plug connections.

In one advantageous development, the sensor material is a crystal arranged at the free end of the optical fibre. In particular rubies are suitable as crystals in this case. Rather than a single crystal, a modified embodiment involves a transparent binder material, in which small luminescent crystals are embedded, for example ruby crystals.

A receptacle in the form of a recess, which receives the sensor material, may be provided at the free end of the polymer optical fibre. The recess has the advantage that the sensor material is held stably at the end of the optic fibre.

In some applications it is advantageous if the sensor material projects beyond the overmould. In this embodiment, the sensor material can be directly brought into contact with a surface whose temperature is to be measured.

In other applications it is advantageous if the sensor material is in thermal contact with an object whose temperature is measured and the free end of the optical fibre is located at a distance from the sensor material but is optically connected to the sensor material. In this embodiment, there is only an optical connection between the free end of the optical fibre and the sensor material. In this way, heat is prevented from being directed away from the measurement location by the optical fibre and from possibly falsifying the measurement result for the temperature.

In this case, a converging lens, which focuses incident light into the optical fibre, is advantageously arranged on the free end of the optical fibre. If the sensor material is not placed directly against the free end of the optical fibre, a converging lens on the free end of the optical fibre has the advantage that more light is focused into the optical fibre. In principle, a higher intensity of the luminescence radiation simplifies the measurement of the temperature, which also improves the accuracy of the temperature measurement.

In the embodiments in which there is a separation between the sensor material and the end of the optical fibre, it is advantageous if the overmould encloses a space that is located between the sensor material and the end of the optical fibre or the converging lens. In this embodiment, the sensor material and the converging lens are located in an enclosed space, and thus their optical properties are not adversely influenced by dirt, moisture and the like.

In one expedient development of the invention, a cap containing sensor material is seated on the free end of the optical fibre. In some embodiments, it has been proven to be expedient if the sensor material is distributed in the form of small crystals in a cap, which is plugged onto the end of the optical fibre. This embodiment is particularly advantageous if strong vibrations occur, because the sensor material that is enclosed in the cap cannot become detached from the optical fibre or from a surface whose temperature is to be measured.

Expediently, the overmould also at least partially encloses the cap with the sensor material in this development. In this way, the cap is held by the overmould. At the same time, the transition between the optical fibre and the cap is sealed.

In a modified embodiment, the sensor material can be applied in the form of a layer onto the object whose temperature is measured. In some applications, it may be advantageous if the sensor material is present in the form of small crystals that are distributed in a lacquer or a plastic that is applied onto a surface whose temperature is to be measured.

According to a second aspect of the invention, a temperature sensor device having a temperature sensor head according to the first aspect of the invention is proposed. The temperature sensor device has a light source, which excites luminescence radiation, which is measured with an optical sensor and evaluated in a controller to ascertain the temperature of the sensor material, in the sensor material of the temperature sensor head with a light pulse. All the advantages that have already been mentioned in connection with the temperature sensor head are realized by way of the temperature sensor device.

According to a third aspect of the invention, an electric machine having a rotor and a stator is proposed. The stator has a winding made from a winding wire. The winding wire is in thermal contact with a temperature sensor head according to the first aspect of the invention. The electric machine has the advantage that a reliable temperature measurement at an electrical winding is possible even if there is little available installation space and strong magnetic fields are present.

In one development of the electric machine, the stator has a plurality of partial windings, which are in thermal contact with one or more temperature sensor heads according to the first aspect of the invention. In this way, it is possible to measure the temperature at a plurality of locations in the electric machine, as a result of which more comprehensive temperature monitoring is achieved.

In a further embodiment of the electric machine, an insulation is locally removed from the winding wire in order to improve the thermal contact between the winding wire and the sensor material of the temperature sensor device. In this embodiment, a temperature drop in the lacquer layer of the winding wire is avoided and the direct temperature measurement at the conductor of the winding wire is made possible.

In one development, an overmould can enclose the contact location or the contact locations between the winding wire and the temperature sensor head. The overmould thus formed has the advantage that a mechanically stable arrangement that is insensitive to environmental influences is obtained.

BRIEF DESCRIPTION OF THE DRAWING

The invention will be explained in more detail below by way of example on the basis of an embodiment with reference to the accompanying figures. All figures are purely schematic and not to scale. In the figures.

Identical or similar elements have the same or similar reference signs in the figures.

DETAILED DESCRIPTION

Figure 1A:
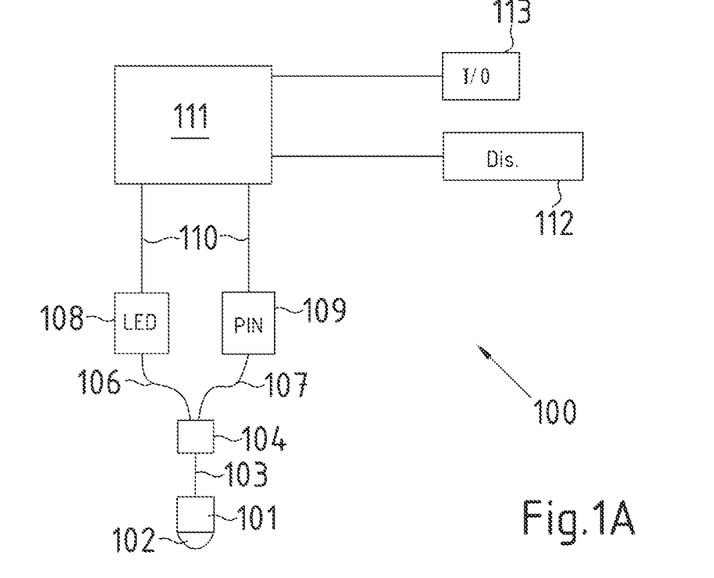
FIG. 1A shows a schematic setup of a temperature measurement device in the form of a block diagram.

FIG. 1A shows a schematic block diagram of a temperature measurement device according to the present invention, which is based on the measurement of luminescence radiation. The temperature measurement device in its entirety is denoted with the reference sign 100. A temperature sensor head 101 is equipped with a sensor material 102, which is excited to luminescence radiation by a light pulse. As was described in the introductory part, the temperature of the sensor material 102 can be ascertained from the temperature-dependent lifetime of the luminescence radiation. In one practical application, the temperature sensor head 101 and mainly the sensor material 102 is brought into thermal contact with an object (not illustrated) whose temperature is to be measured.

The temperature sensor head 101 is situated at a free end of an optical fibre, in particular of a polymer optical fibre (POF) 103. The optical fibre 103 leads to a fibre coupler 104, which connects the optical fibre 103 to two optical fibres 106, 107, which for their part are preferably polymer optical fibres. The POF 106 establishes an optical connection to a light-emitting diode 108, while the POF 107 provides an optical connection to a photodetector 109, which is, for example, a PIN photodetector. The light-emitting diode 108 and the photodetector 109 are electrically connected to a controller 111 by means of electrical lines 110 for transmitting signals and supply voltages. The controller 111 is connected to a display 112, on which for example the measured temperature is displayed. Moreover, the controller has an interface 113, which makes it possible to connect the temperature measurement device 100 to a data bus (not illustrated).

Broadly speaking, the function of the controller 111 is such that the light-emitting diode 108 transmits a light pulse onto the sensor material 102 and thereby excites luminescence radiation. The light-emitting diode emits, for example, green light in the wavelength range of 500 nm-580 nm, which is modulated with a frequency of 50 Hz. The light pulse duration is approximately 5 ms. In the case of glass-fibre optical waveguides, light in the wavelength range from 800 nm to 1600 nm is used. In other exemplary embodiments, other wavelengths, another modulation frequency and other light pulse durations may be expedient, which depends on the wavelength with which luminescence radiation of the sensor material can be excited and on how long the lifetime of this luminescence radiation is.

The temporal drop of the luminescence radiation is observed in the photodetector 109. The controller 111 ascertains from the measurement signals of the photodetector 109 the lifetime of the luminescence radiation and ultimately the temperature of the sensor material 102, as was already explained in the introductory part. In the practical application, the sensor material 102 is in thermal contact with an object (not illustrated) whose temperature is measured. Consequently, the temperature of the sensor material 102 substantially corresponds to the temperature of the measured object.

In a concrete exemplary embodiment, the POFs 103, 106 and 107 have a diameter of 1 mm and consist of a PMMA (polymethyl methacrylate) core having a thickness of 0.98 mm and of an optical covering, made of fluorinated acrylate or fluoropolymer, having a thickness of 0.02 mm. The optical covering is also referred to as "cladding". A mechanically protective covering ("coating") is disposed over the cladding. The advantages of the POFs are their small diameter, low weight, good flexibility and insensitivity to electromagnetic influences. In addition, POFs are connectable with simple plug connections. When used in vehicles, where the temperature measurement device 100 is exposed to environmental influences, it is necessary to protect in particular the temperature sensor head 101 with the sensor material 102 against them. The environmental influences include humidity, dust and vibrations, to mention but a few.

Figure 1B:
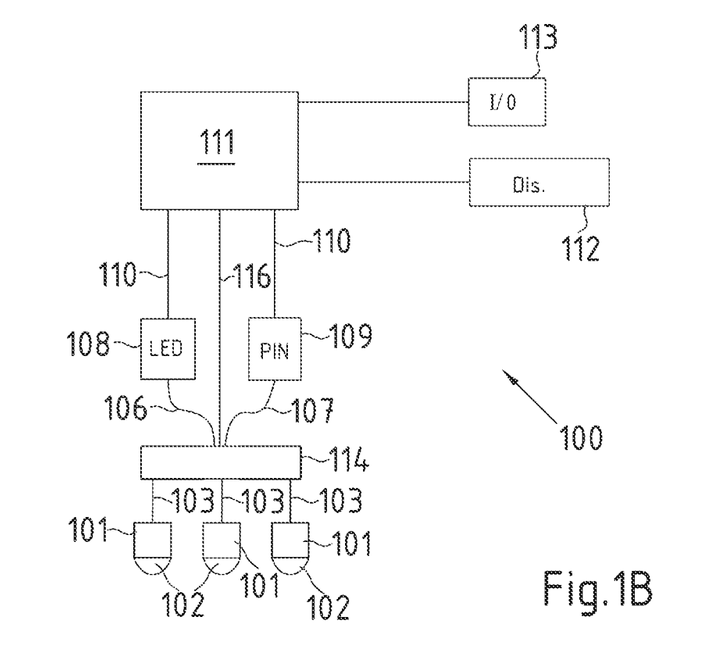
FIG. 1B shows a schematic setup of a further temperature measurement device in the form of a block diagram.

FIG. 1B illustrates a temperature measurement device 100' having a plurality of temperature sensor heads 101. The temperature sensor heads 101 are connected to an optical multiplexer 114, which permits targeted guidance of a light pulse from the light-emitting diode 108 to one of the sensor heads 101 and the measurement and evaluation of the luminescence radiation of the relevant temperature sensor head 101 after the light pulse. For this purpose, the optical multiplexer 114 is correspondingly controlled by the controller 111 via a control line 116. In FIG. 1B, three temperature sensor heads 101 are illustrated, but in other embodiments merely two or more than three temperature sensor heads 101 may also be present.

In a further embodiment (not illustrated), each temperature sensor head 101 is assigned in each case one light-emitting diode 108 and one photodetector 109.

FIGS. 2A to 2G illustrate different embodiments of the temperature sensor head 101 for a temperature measurement device 100 according to the invention.

Figure 2:
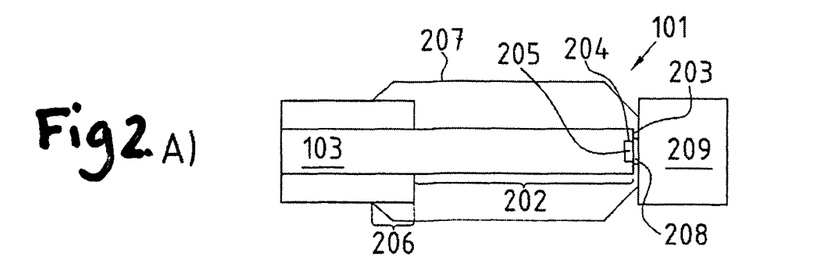
FIG. 2A-2G show a schematic setup of an end of a polymer optical fibre with sensor material.

FIG. 2A shows a first embodiment of the temperature sensor head 101. The POF 103 is surrounded by a protective covering 201, which protects the POF 103 against environmental influences and mechanical damage. The protective covering 201 has been removed from a free end 202 of the POF 103. At an end face 203 of the POF 103, a recess 204 for receiving sensor material 205 is formed. The sensor material 205 is for example a ruby crystal. A protective body 207, which renders the free end 202 of the POF 103 mechanically stable and insensitive to environmental influences, is moulded over a section 206 of the protective covering 201 and the free end 202 of the POF 103. A window 208, which is filled with a material of good thermal conductivity, is arranged in the protective body 207 such that it adjoins the sensor material 205. The window 208 and the protective body 207 lie against an object 209 such that the sensor material 205 is in good thermal contact with the object 209. In this way, an optical temperature measurement at the object 209, as described above, is possible. For attaching the protective body to the object, the protective body 207 is provided in one exemplary embodiment with a thread (not illustrated), which allows the temperature sensor head 101 to be fixedly screwed to the object 209. In alternative exemplary embodiments, the sensor head is adhesively bonded to a surface of the object 209.

FIG. 2B shows a second embodiment of the temperature sensor head 101. This second embodiment differs from the first embodiment illustrated in FIG. 2A in that the sensor material 205 is arranged directly on the end face 203 of the POF 103. That is to say that the end face 203 of the POF 103 has no recess. In this second embodiment, the sensor material 205 projects into the window 208 in the protective body 207 and forms a planar surface with the end face of the protective body. The sensor material 205 comes into direct contact with the object 209, which results in good thermal coupling to the object 209.

FIG. 2C illustrates a third embodiment of the temperature sensor head 101, in which a plano-convex lens 211 is arranged on the end face 203 of the POF 103. The lens is, for example, bonded to the end face 203 using an optically transparent adhesive. The lens 211 converges incident light and focuses it into the POF 103. In this exemplary embodiment, the sensor material 205 is arranged directly on the object 209. The sensor material is, for example, an adhesively bonded ruby crystal. In contrast to the first two exemplary embodiments, there is no physical contact between the POF 103 and the sensor material 205; rather, there is simply an optical connection between the two. The temperature measurement still takes place according to the same principle, in which a light pulse excites luminescence radiation in the sensor material 205 that is converged by the lens 211 and evaluated in the controller 111, as was described in connection with FIG. 1.

Since the POF 103 and the sensor material 205 do not touch, measurement errors that occur because a specific amount of heat is removed from the sensor material 205 by the POF 103, causing the temperature measured by the sensor material 205 to be lower—even if only slightly—than the actual temperature of the object 209, are ruled out in this exemplary embodiment.

FIG. 2D shows a fourth embodiment of the temperature sensor head 101. This exemplary embodiment differs from the exemplary embodiment shown in FIG. 2C in that the protective body 207 extends to the object 209 and forms a cavity 212 in the interior thereof. The cavity 212 extends from the lens 211 to the object 209 and receives the sensor material 205. The protective body 207 protects both the lens 211 and also the sensor material 205 against possibly harmful environmental influences.

FIG. 2E shows a fifth embodiment of the temperature sensor head 101. The protective body 207 has a window 208, which has a distance from the sensor material 205 of less than 1 mm. The sensor material 205 is again connected to the object 209, for example is adhesively bonded to the object 209. Luminescence radiation generated in the sensor material 205 by way of the light pulse enters the POF 103 through the window 208. Owing to the small distance between the end face 203 of the POF 103 and the sensor material 205, it is possible to dispense with a converging lens.

FIG. 2F illustrates a sixth embodiment of the temperature head 101. In this embodiment, a cap 203, which is made of a transparent polymer in which small ruby crystals or another luminescence material is/are embedded, is placed on the free end 202 of the POF 103. The protective body 207 extends over the protective covering 201 and the cap 213. The cap 213 is in thermal contact with the object 209 and thus permits a temperature measurement of the object 209.

FIG. 2G shows the sensor head 101 from FIG. 2E, wherein, in this exemplary embodiment, the sensor material 205 is applied onto the object 209 in the form of a lacquer or a binder material containing small ruby crystals. Luminescence radiation generated in the sensor material 205 enters the POF 103, as in the exemplary embodiment from FIG. 2E, through the window 208 in the protective body 207.

Figure 3:
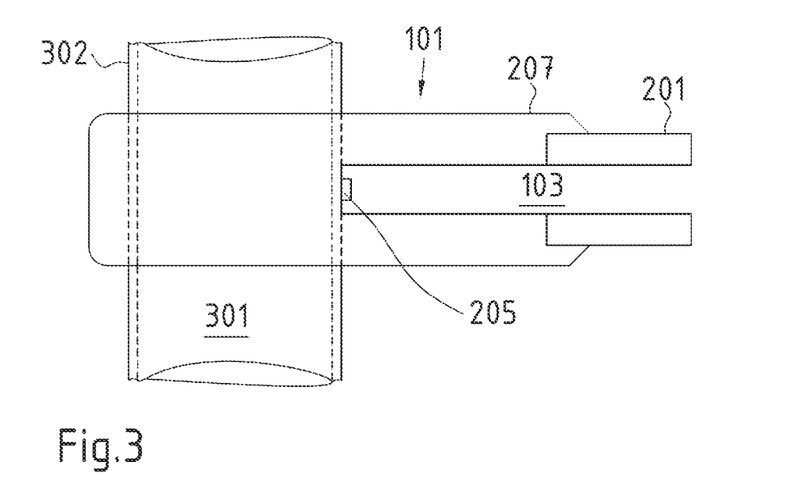
FIG. 3 shows a winding wire with a temperature sensor head arranged thereon.

FIG. 3 shows an enlarged section of a winding wire 301 of an electric machine, such as an electric motor or generator. The electric motor can be, for example, the drive motor of an electric vehicle. The winding wire is electrically insulated with a lacquer layer 302. A temperature sensor head 101, which is substantially constructed like the temperature sensor head 101 shown in FIG. 2A, is placed on the lacquer layer 302. The sensor material 205 of the temperature sensor head 101 is in direct contact with the lacquer layer 302. The sensor material 205 thus measures the temperature of the lacquer layer 302. In this case, the protective body 207 is moulded around the winding wire 301 and the POF 103 or the protective covering 201. This creates a mechanically stable arrangement, which is insensitive to environmental influences.

In an exemplary embodiment that is not illustrated, a small hole, into which the free end 202 of the POF 103 is inserted, is drilled or etched into the lacquer layer and/or into the copper wire. This arrangement is likewise overmoulded by a protective body 207, which encloses both the winding wire 301 and also the POF 103 or the protective covering 201. It is possible with this arrangement to measure the temperature of the conductor of the winding wire.

The small size of the temperature sensor head 101 according to the invention, the flexibility of the POF 103 and the insensitivity of the optical temperature measurement to high magnetic fields make it possible to measure temperatures in the interior of an electric machine. Expediently, a plurality of temperature sensor heads that permit the temperature measurement at critical locations in the interior of the electric machine may also be arranged in the electric machine. The plurality of POFs 103 of the temperature sensor heads are connected for this purpose to an optical multiplexer 104, with the result that a single light-emitting diode 108 and a single photodetector 109 suffice to perform the temperature measurement with the plurality of temperature sensor heads 101. A schematic set up of such a temperature measurement 100' is illustrated in FIG. 1B.

The connection of the temperature sensor head to a winding wire can be realized, for example, even before the production of the winding for the electric machine. In this case, the POF is guided out of the finished winding and connected to a temperature measurement device using a plug connection.

Although the invention has been described primarily in connection with POFs, it is realizable even with other optical fibres, in particular glass fibres, which are better suited to higher temperatures.

List of reference signs

| | |
|---|---|
| 100 | Temperature measurement device |
| 101 | Temperature sensor head |
| 102 | Temperature sensor material |
| 103 | Optical fibre |
| 104 | Fibre coupler |
| 106, 107 | Optical fibre |
| 108 | Light-emitting diode |
| 109 | Photodetector |
| 110 | Lines |
| 111 | Controller |
| 112 | Display |
| 113 | Interface |
| 114 | Optical multiplexer |
| 116 | Control line |
| 201 | Protective covering |
| 202 | Free end |
| 203 | End face |
| 204 | Recess |
| 205 | Sensor material |
| 206 | Section of protective covering |
| 207 | Protective body |
| 208 | Window |
| 209 | Object |
| 211 | Lens |
| 212 | Cavity |
| 213 | Cap |
| 301 | Winding wire |
| 302 | Lacquer layer |
| 401 | Temperature sensor |
| 402 | Housing |
| 403 | Electrical measurement element |
| 404 | Holder |
| 406A, 406B | Connections |
| 407A, 407B | Contact locations |
| 408A, 408B | Conductor |
| 409 | Cable |

The invention claimed is:

1. An electric machine having a rotor and a stator, wherein the stator has a winding made from a winding wire, which is insulated with a lacquer layer, wherein the winding wire is in thermal contact with a temperature sensor head comprising an optical fibre and a sensor material, which is optically connected to a free end of the optical fibre, wherein the free end of the optical fibre has an overmould made of a plastics material, which engages over a free end of the optical fibre, wherein the overmould encloses the contact location or the contact locations between the winding wire and the temperature sensor head and forms a protective body, wherein the protective body is moulded around the winding wire.

2. The electrical machine according to claim 1, wherein the optical fibre is a polymer optical fibre.

3. The electrical machine according to claim 1, wherein the sensor material is a crystal that is arranged at the free end of the optical fibre.

4. The electrical machine according to claim 3, wherein a receptacle in the form of a recess, which receives the sensor material is provided at the free end of the optical fibre.

5. The electrical machine according to claim 1, wherein the sensor material is in thermal contact with the winding wire whose temperature is measured and the free end of the optical fibre is located at a distance from the sensor material.

6. The electrical machine according to claim 5, wherein a converging lens, which focuses incident light into the optical fibre, is arranged on the free end of the optical fibre.

7. The electrical machine according to claim 5, wherein the overmould encloses a space that is located between the sensor material and the end of the optical fibre or the converging lens.

8. The electrical machine according to claim 5, wherein the sensor material is applied in the form of a layer onto the winding wire whose temperature is measured.

9. The electrical machine according to claim 1, wherein a cap containing sensor material is seated on the free end of the optical fibre.

10. The electrical machine according to claim 9, wherein the overmould at least partially encloses the cap with the sensor material.

11. The electric machine according to claim 1, wherein an insulation is locally removed from the winding wire in order to improve the thermal contact between the winding wire and the sensor material of the temperature sensor device.

* * * * *